UNITED STATES PATENT OFFICE.

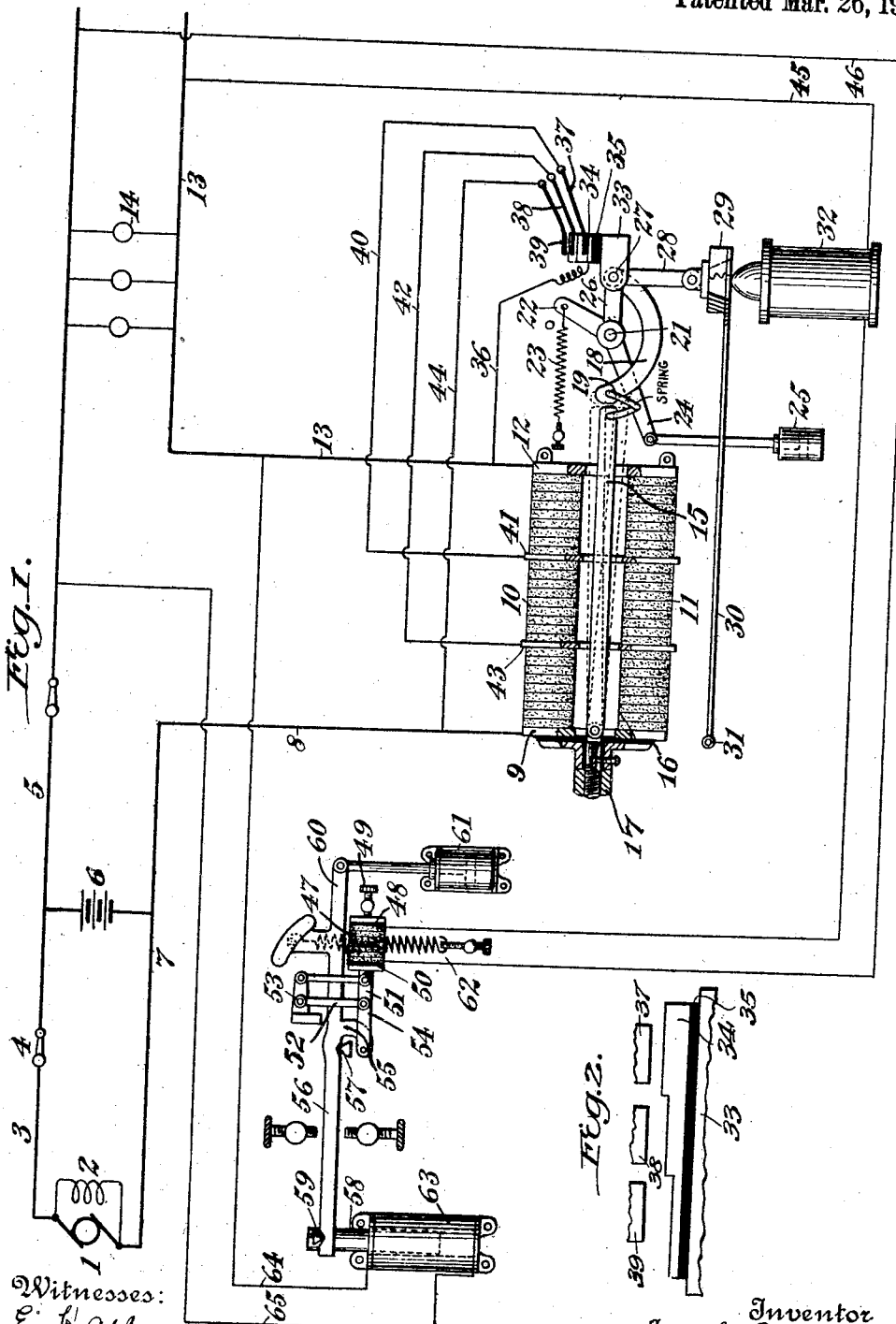

JOSEPH BIJUR, OF NEW YORK, N. Y., ASSIGNOR TO THE SAFETY CAR HEATING & LIGHTING COMPANY, OF NEW YORK, N. Y., A CORPORATION OF NEW JERSEY.

ELECTRIC REGULATOR.

1,260,994.  Specification of Letters Patent.  Patented Mar. 26, 1918.

Application filed December 1, 1909. Serial No. 530,771.

*To all whom it may concern:*

Be it known that I, JOSEPH BIJUR, a citizen of the United States, residing in New York, county of New York, and State of New York, have invented new and useful Improvements in Electric Regulators, of which the following is a description.

My invention pertains to that class of electric regulators adapted to automatically govern an electric circuit to produce therein conditions which may be predetermined.

My regulator has for a particular object to provide means whereby the current in or voltage upon a circuit may be automatically governed to be held constant regardless of various line conditions tending to cause fluctuations.

As my regulator is particularly adapted to hold constant the voltage upon a lamp or translation circuit in connection with storage batteries and a generator for charging the same, the operation of which necessarily causes considerable fluctuation in voltage across the line, the same will be described in connection with such a system.

In the accompanying drawing Figure 1 is a diagram representing one type of such system embodying the essentials of my invention, while Fig. 2 represents a detail of the apparatus.

Referring to the drawing, 1 represents any suitable type of dynamo or generator provided with the usual field winding 2. 3 represents the positive lead from the generator which is carried to any suitable type of switch as indicated at 4 from which the main 5 is carried to the positive terminal of the storage battery 6, the negative of which is connected with the negative lead 7 of the generator 1. The lead 7 is connected as by wire 8 with the metal plate 9 in contact with a plurality of carbon disks as indicated at 10 and 11 which also make contact with the fixed conducting member 12 from which the main 13 is led to the lamps or translating devices indicated at 14. 15 represents a metallic rod passing through the plate or member 12 and member 9 and insulated therefrom as by insulating members 16. This rod is free to move through the opening in the member 12 and has its position determined with regards the member 9 by means of nut 17. This rod is joined to the curved link 18 as by means of the tension spring 19 tending to hold the rod and link together. 21 represents a shaft upon which is mounted the lever 22 attached to the adjustable spring 23 in such manner that the said spring tends to revolve the shaft in a left-handed direction. The lever 24 is attached to the shaft 21 and connected with the dash-pot 25 which tends to resist too sudden revolution of the shaft 21. 26 is a lever attached to the shaft 21 and also to the link 18 as by means of pin 27. This pin also engages the link 28 attached to the armature 29 carried by the member 30 and pivotally supported as indicated at 31. The armature 29 is in operative relation to one or more magnets 32 and it will be obvious that any downward movement given to the armature 29 when attracted by the magnet 32 will cause the lever 26 to be lowered against the action of spring 23 and dash-pot 25 and thus cause the link 18 to be moved in a left-handed direction so as to allow the rod 15 to move in a left-handed direction and carry therewith the plate 9 in such manner as to reduce the pressure upon the carbon piles 10 and 11 and thereby increase the resistance of the said carbon piles. The lever 26 is provided with an extension 33 carrying a conducting member 34 insulated therefrom as by member 35. The member 34 is connected with the main 13 as by wire 36. 37, 38 and 39 represent flexible brushes or wipers adapted to successively come in contact with the steps of the member 34 as the same is allowed to move upwardly from the position shown in the drawing. The member 37 is connected with the wire 40 which is led to the metallic plate or conducting member 41 connecting the carbon disks at a suitable point as indicated in the drawing. 38 is connected as by wire 42 with the conducting member 43 which is connected into the carbon disks at a suitable point. 39 is connected as by wire 44 with the lead 8. The magnet 32 is connected with the translation circuit as by means of wires 45 and 46 which have in series therewith a small carbon pile resistance 47, one end of which is in contact with the member 48 adjustable as by screw 49. The other end of the carbon pile 47 is in contact with the disk 50 carried by the member 51 which is supported by the parallel links 52 pivotally mounted as indicated at 53. The member 51 has connected therewith the link 54 engaging the lever 55 which is connected to the horizontal lever 56 suspended as by the knife-blade 57 and carrying a core of magnetizable material 58 suspended thereon as by means of the knife-blade 59. 60 represents an extension of the lever 56 which is connected with any suitable type of dash-pot indicated at 61. 62 is an adjustable spring pulling downwardly upon the lever 60 and thus tending to raise the core 58. The core 58 is surrounded by a solenoid 63 in circuit across the translating mains as by wires 64 and 65.

The operation of my improved electric regulator is a follows, starting with the generator considered as in operation and supplying current to the lamps or translating devices and a small charging current to the battery so that the generator voltage is only slightly in excess of the normal discharging voltage of the storage battery:

Under these conditions the voltage across the mains 5 and 7 will be somewhat higher than that supplied by the battery when the generator is at rest and I so adjust the spring 62 that the current through the coil 63 by exerting its pull upon the core 58 will cause the lever 56 to be slightly depressed and the carbons 47 slightly compacted so as to allow sufficient current to flow through the magnet 32 to give the armature 29 the position shown in the drawing in which position contact between the member 34 and the members 37, 38 and 39 is broken and the current to the lamps or translating devices passes through the carbon piles 10 and 11 which are now under their maximum compression. If now the voltage of the generator be raised as by an increase in speed, the voltage across the mains 5 and 13 will tend to rise and an extremely small rise will cause the core 58 of the relay to be drawn downwardly and further compress the carbons 47 so as to increase the current still further in the magnet 32. This will draw down the armature 29 and cause the lever 26 to revolve the shaft 21 against the action of spring 23, sudden movement of the shaft being arrested by the action of the dash-pot 25. This downward movement of the lever 26 will cause the link 18 to be moved in a left-handed direction and a very small portion of this initial movement will be taken up by the spring 19 in drawing the link 18 against the rod 15. Then any further movement will cause the rod 15 to move in a left-handed direction and thereby lessen the pressure upon the carbon disks 10 and 11 and increase the resistance in the lamp or translation circuit. This will continue until the voltage across the lamp or translating circuit is brought down to substantially the normal when the pull of the coil 63 will be balanced by the spring 62. Any further slight increase in voltage will cause the coil 63 to further act to compress the carbons 47 and increase the current in the magnet 32 and further draw down the armature 29 and thus increase the resistance of the carbon piles 10 and 11 as above described. Owing to the fact that the rod 15, shaft 21 and lever 26 are substantially in line with each other when the maximum compression is exerted upon the carbon piles 10 and 11, it will be obvious that considerable motion has to be given to the lever 26 in its initial movement to cause a very slight movement of the rod 15 and that after the lever 26 has been pulled down out of alinement motion imparted to the rod 15 by a given arc described by the lever 26 will be much greater than when the lever is in substantially the position shown in the drawing. In other words, the connection between the lever 26 and rod 15 is such that as the carbons are compressed toward the point of maximum compression the leverage increases very rapidly to exert a stronger pull upon the rod per degree of swing imparted to the lever 26 by the spring 23, whereas as the lever 26 is drawn downwardly until the pressure upon the carbon disks has been lowered below the maximum then the leverage so varies that further motion to the lever 26 causes the carbons which are now under lesser pressure to be opened farther per degree of swing imparted to the lever 26. It will be obvious from the drawing and the above description that the lever 26, the link 18, and the rod 15 form in effect a toggle adapted to exert pressure upon the carbon pile at an increasing rate as the elements of the toggle approach the position shown in Fig. 1, in which the pivots are in the same straight line. It may be noted that the mechanical resistance to compression of a pressure controlled variable resistance medium increases at an increasing rate as compression progresses. If the curve of compression be plotted with compressive force as ordinates and linear compression as abscissae it will be upwardly concaved and correspond closely to the curve repersenting the force exerted by a toggle as it approaches its center, with a uniform turning movement. As the toggle comes upon its center, however, its force is theoretically infinity and accordingly increases at this stage much faster than the resistance to compression offered by the carbons. It should also be noted that as compression progresses the spring 23 loses a portion of its tractive force but this is substantially compensated for by the increase of the effective leverage through which it acts on the shaft 53. The increase in pull as the armature 29 approaches the pole of the magnet 32 substantially compensates for the corresponding decrease in effect of the lever 26. The result of these various effects is to cause variations in current in the magnet 32 to produce substantially proportional variations in resistance of the circuit. It will be obvious that owing to the considerable length of the lever 56 and the short length of the lever 55 a very small difference in pull upon the core 58 will cause a considerable decrease in the resistance 47 which will cause the resistance of the carbon piles 10 and 11 to vary in such manner as to hold the voltage across the translation circuit constant within a very narrow margin. If when considerable resistance has been inserted in the translation circuit as above described the generator shall slow down so as to cause the line voltage to drop, the pull upon the core 58 will lessen and cause the pressure upon the carbons 47 to lessen and thus decrease the current in the magnet 32 and allow the spring 23 to revolve the shaft 21 in a left-handed direction and thus move the rod 15 in a right-handed direction so as to compact the carbons 10 and 11 and decrease the resistance thereof in such manner as to hold the voltage across the translation circuit substantially constant. If the generator be disconnected as by opening the switch 4 the current will then all be supplied by the battery 6 and if the voltage of the battery be high due to a charged condition the voltage across the translation devices will for a time remain above the normal and the coil 63 will cause some resistance to be inserted in the translation circuit. However, if the load be continued on the battery for any reasonable time, the voltage will fall and the coil 63 will allow the core 58 to rise and this in turn will cause the magnet 32 to weaken and allow the spring 23 to further lift the armature 29 and cut out the resistances 10 and 11 until the lever 26 has swung into such position that further motion thereof will separate the link 18 from the rod 15 against the action of spring 19. I so construct the spring 19 that this slight separation caused by further movement of the lever 26, after it has almost reached dead center, will cause approximately constant pull upon the rod 15 which pull is so adjusted as to decrease the resistance of the carbon piles as much as practicable by increasing the pressure thereon and then as the voltage tends to fall across the translation circuit and the relay further weakens the magnet 32 so as to allow the armature 29 to rise, this movement will cause the member 34 to come in contact with the member 37 and shunt out that portion of the carbon disks between the members 41 and 12 by means of wire 40. Further decrease in voltage will allow the spring 23 to further raise the lever 26 and then make contact with the flexible connection 38 which will cause that portion of the disks between members 43 and 41 to also be short-circuited by wire 42. Further decrease in voltage will cause contact between the members 34 and 39 and entirely shunt out the carbon piles 10 and 11 by means of wire 44.

From the foregoing it will be obvious that I have produced an electric regulator which if used for the governing of voltage across a translation circuit may be so constructed as to hold the same constant within very narrow limits as far as variation in resistance of the circuit may be controlled by varying the pressure upon a carbon disk rheostat included therein and that after the said resistance has been lowered as much as practicable, by compression of the carbons, further reduction in resistance will be accomplished by shunting out a portion or all of the carbon members while they remain under substantially constant pressure. It will also be obvious that if it be desired to use my regulator for the purpose of holding the current rather than the voltage constant the same may readily be done by substituting a coarse winding for the winding 63 and placing the same in series with the circuit to be governed—that is, giving the relay ammeter connections instead of volt meter connections as is well known in the art.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having thus described my invention that which I consider as novel and desire to protect by Letters Patent is as set forth in the following claims:

1. An electric regulator comprehending a variable resistance the value of which varies under variations in pressure, a movable member the motion of which controls said resistance, a second movable member, yielding means connecting said members, resilient means for controlling the motion of said second movable member, and electro-magnetic means acting in opposition to said resilient means for controlling said second movable member.

2. An electric regulator comprehending a variable resistance the value of which varies under variations in pressure, a movable member the motion of which determines the value of said resistance, a second movable member, resilient means tending to move the same, electro-magnetic means coöperating therewith and yielding means for uniting the said movable members.

JOSEPH BIJUR.

Witnesses:
CHARLES McC. CHAPMAN,
E. HALL.